M. V. ROBERTS.
HEAT INSULATED RECEPTACLE.
APPLICATION FILED JUNE 26, 1912.

1,088,453.

Patented Feb. 24, 1914.

2 SHEETS—SHEET 1.

Inventor
Mortimer V. Roberts

By Victor J. Evans
Attorney

Witnesses

M. V. ROBERTS.
HEAT INSULATED RECEPTACLE.
APPLICATION FILED JUNE 26, 1912.

1,088,453.

Patented Feb. 24, 1914.

2 SHEETS—SHEET 2.

Witnesses

Inventor
Mortimer V. Roberts
By Victor J. Evans
Attorney

UNITED STATES PATENT OFFICE.

MORTIMER V. ROBERTS, OF CHISHOLM, MINNESOTA.

HEAT-INSULATED RECEPTACLE.

1,088,453.

Specification of Letters Patent. Patented Feb. 24, 1914.

Application filed June 26, 1912. Serial No. 705,999.

*To all whom it may concern:*

Be it known that I, MORTIMER V. ROBERTS, a citizen of the United States, residing at Chisholm, in the county of St. Louis and State of Minnesota, have invented new and useful Improvements in Heat-Insulated Receptacles, of which the following is a specification.

This invention relates to shipping and storing vessels and more particularly to devices of this character which are provided with temperature maintaining means.

One of the principal objects of the invention is to provide a device of this character wherein the contents of the receptacle may be brought to a predetermined temperature and maintained by vacuum insulation in such condition for a great length of time.

A further object of the invention is the provision of means for perfectly cooling or heating the contents of the receptacle and for utilizing the pipes which convey the heating element to the receptacle for obtaining a vacuum around the same and for determining the amount of vacuum present.

Further objects of this invention will appear as the following specific description is read in connection with the accompanying drawing, which forms a part of this application, and in which:—

Figure 1:
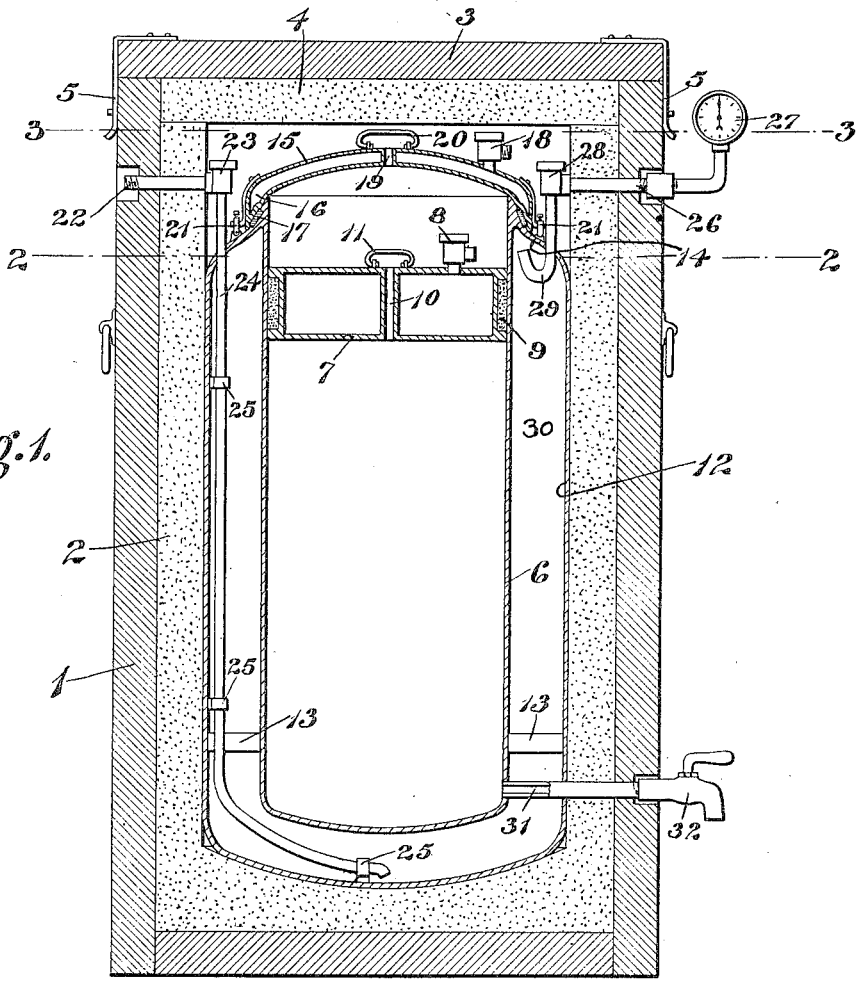
Figure 4:
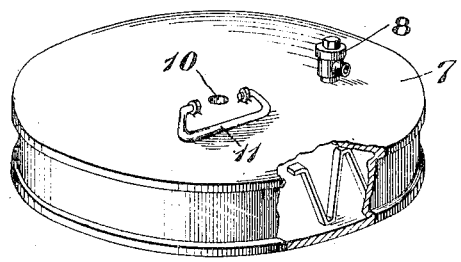
Figure 5:
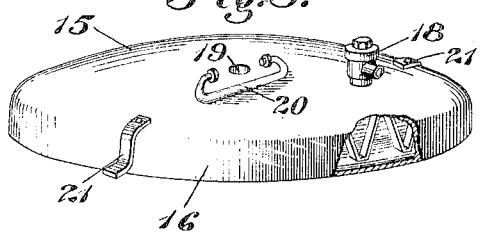
Figure 2:
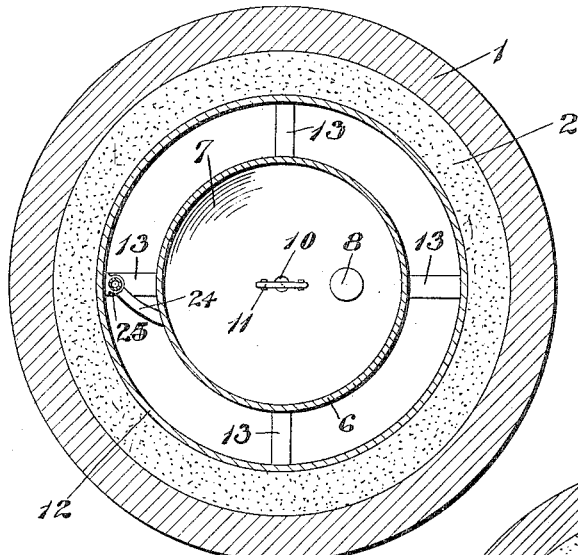
Figure 3:
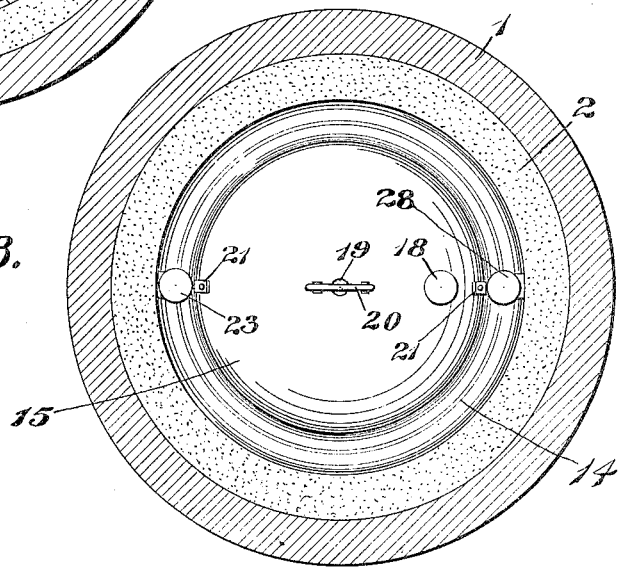
Figure 6:
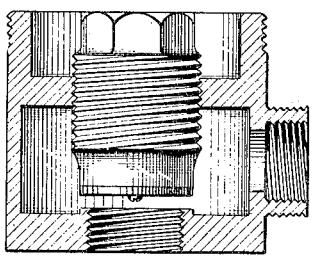

Figure 1 is a vertical sectional view. Fig. 2 is a horizontal sectional view on the line 2—2 of Fig. 1. Fig. 3 is a similar section on the line 3—3 of Fig. 1. Fig. 4 is a perspective view of the follower with parts broken away. Fig. 5 is a similar view of the vacuum lid with parts broken away. Fig. 6 is a sectional view of one of the valves employed with caps removed therefrom.

Referring more particularly to the drawing, 1 represents a casing of any suitable material or cross sectional formation which is lined preferably with a lining of felt 2. The lid 3 is similarly lined, as at 4, and is adapted to close the outer casing and is held down in position thereon by means of catches 5, or other suitable fastening devices. Mounted in the casing is a receptacle 6 in which the material to be heated or cooled is placed and operating within this receptacle is a follower 7 which is hollow and has connected thereto a valve 8 by which a vacuum may be obtained in the follower. The follower has a packing 9 surrounding the same which bears directly upon the inner walls of the receptacle and makes a tight joint therewith and permits free movement of the follower within the receptacle. Passing centrally through the follower is a vent tube 10 and positioned over the upper end of the vent tube is a handle 11 by which the follower may be raised out of the receptacle. Connected to the receptacle in air tight relation and spaced away therefrom so to form a chamber 30 is a shell 12 which is held at an equal distance all around from the receptacle 6 by means of braces 13. The upper portion of this shell tapers inwardly into position to be connected to the receptacle 6, as shown at 14. Closing the upper end of the receptacle is a hollow lid 15 which is provided with a depending hollow flange 16 which rests against a gasket 17 carried by the connecting portion 14 between the receptacle 6 and the shell 12. This lid is provided with a valve 18 through which the air may be exhausted therefrom and has a central vent tube 19 and a manipulating handle 20. The lid is held down upon the receptacle by means of the fastening means 21.

Leading through the outer casing and through the lining 2 above the connecting member 14 is a pipe 22 having a valve 23 upon its inner end which is connected also to a pipe 24 leading downwardly through the connecting member 14 to the bottom of the shell 12 beneath the receptacle and is held in such position by bracket fasteners 25. The outer end of the pipe 22 is provided with a thread by which the same may be connected to any suitable vacuum apparatus. Leading into the casing from the opposite side is a pipe 26 which has removably secured to its outer end a vacuum gage 27 and has secured to its inner end a valve 28 to which is also connected a pipe 29 extending through the connecting member 14. The pipes 24 and 29 are connected to the member 14 in air tight relation so that no air can enter into the compartment 30 at their joints.

In the operation of the device, the outer lid, vacuum lid 15, and follower 7, are removed and the material desired placed within the receptacle 6. The air is exhausted from the follower 7 by connecting up the valve 8 with any suitable type of exhausting mechanism and the valve closed. The air is also exhausted from the lid 15 and the same placed in operating position by the catches 21, the vents 10 and 19 being plugged with a cork or other suitable stopper. The gage 27 is then removed from the pipe 26 and the pipe 22 is connected up to any type of device which will supply a cooling or heating agent. The valves 23 and 28 are then opened and the cooling or heating agent allowed to pass through the compartment or chamber 30 until the desired temperature is reached. The pipe 22 is then disconnected from the source of cooling or heating supply and connected to a suitable exhausting pump or other device, whereby the cooling or heating agent may be exhausted from the chamber 30. After this operation is completed, the gage is again mounted upon the pipe 26 and the exhausting operation continued until the desired vacuum is obtained, at which time, the valves 23 and 28 are closed and the cover 15 locked in position upon the receptacle. Ammonia or any other cooling agent may be used to cool the contents in the receptacle 6 or the pipe 22 may be connected to a source of steam or hot water supply for thawing out or heating the contents of the receptacle 6, as is desirable. The receptacle 6 has secured to and communicating with its lower end an outlet pipe 31 which has removably connected thereto a faucet 32, as shown. This faucet is adapted to be disconnected when the device is used for shipping purposes and only applied to the pipe 31 when it is desired to use the device as a water cooler. When the faucet is removed, a suitable closing cap is applied.

What is claimed is:—

In combination, a receptacle, a vacuum chamber surrounding the receptacle, a combined feeding and exhausting pipe leading into the chamber and extending beneath the receptacle, an outlet pipe leading into the receptacle adjacent the top of the chamber, valves for said pipes, a vacuum gage removably secured to the outlet pipe, a hollow follower mounted in the receptacle, a valve connected thereto, whereby the air may be exhausted therefrom, a vacuum lid mounted on the receptacle and vents in the follower and lid.

In testimony whereof I affix my signature in presence of two witnesses.

MORTIMER V. ROBERTS.

Witnesses:
　PAUL THOMPSON,
　ELMER A. NELSON.